United States Patent [19]

Kurata et al.

[11] Patent Number: 4,494,623
[45] Date of Patent: * Jan. 22, 1985

[54] POWER TRANSMISSION CASING APPARATUS IN MOTORIZED TWO-WHEELED VEHICLE

[75] Inventors: Noboru Kurata, Kamifukuoka; Kunio Miyazaki, Oi; Kuniyuki Yamamoto, Kodaira, all of Japan

[73] Assignee: Honda Giken Kogyo Kabushiki Kaisha, Tokyo, Japan

[*] Notice: The portion of the term of this patent subsequent to Aug. 17, 1999 has been disclaimed.

[21] Appl. No.: 408,685

[22] Filed: Aug. 16, 1982

Related U.S. Application Data

[62] Division of Ser. No. 178,942, Aug. 15, 1980, Pat. No. 4,344,500.

[30] Foreign Application Priority Data

Aug. 21, 1979 [JP] Japan .................. 54-105543

[51] Int. Cl.³ .............................. B62M 9/06
[52] U.S. Cl. .................. 180/230; 74/606 R; 474/146
[58] Field of Search ........... 180/219, 227, 228, 230, 180/231, 205, 206, 207; 474/11, 13, 70, 146; 74/606 R

[56] References Cited

U.S. PATENT DOCUMENTS

| 3,002,399 | 10/1961 | Ruess | 74/625 |
| 3,360,998 | 1/1968 | Griffel | 74/216.5 |
| 4,067,243 | 1/1978 | Kurata et al. | 74/6 |
| 4,091,887 | 5/1978 | Kurata et al. | 180/33 |
| 4,304,150 | 12/1981 | Lupo et al. | 74/677 |
| 4,344,500 | 8/1982 | Kurata et al. | 180/230 |
| 4,345,664 | 8/1982 | Anno et al. | 180/230 |

FOREIGN PATENT DOCUMENTS

| 50600 | 5/1934 | Denmark | 474/146 |
| 1036083 | 1/1959 | Fed. Rep. of Germany . | |
| 1295276 | 4/1962 | France | 180/230 |
| 1379629 | 10/1964 | France . | |
| 51-21272 | 6/1976 | Japan . | |
| 1158390 | 7/1969 | United Kingdom . | |
| 2052410 | 1/1981 | United Kingdom | 180/231 |

Primary Examiner—John A. Pekar
Attorney, Agent, or Firm—Armstrong, Nikaido, Marmelstein & Kubovcik

[57] ABSTRACT

A power transmission casing apparatus in a motorized two-wheeled vehicle which comprises a case main body extending from one lateral side of an internal combustion engine to one lateral side of a rear wheel in rear thereof and supporting rotatably a wheel axle of the rear wheel. The case main body is applied with a cover member for containing therein liquid-tightly a reduction gear means, and is applied with another cover member for containing therein a V-belt means.

2 Claims, 3 Drawing Figures

POWER TRANSMISSION CASING APPARATUS IN MOTORIZED TWO-WHEELED VEHICLE

This is a division of application Ser. No. 178,942, filed Aug. 15, 1980, now U.S. Pat. No. 4,344,500 issued Aug. 17, 1982.

BACKGROUND OF THE INVENTION

This invention relates to a power transmission casing apparatus in a motorized two-wheeled vehicle such as a motorcycle or the like.

In general, it is preferable in a two-wheeled vehicle of this kind to use a V-belt means with the intention of transmitting an output of an internal combustion engine to a rear wheel provided in rear thereof, because there is a comparatively large distance between an output shaft of the engine and a wheel axle of the rear wheel. And it is required for this case to provide a reduction gear means for reducing a speed of the output shaft because it is comparatively high in rotation speed, and additionally it is preferable in this case that the reduction gear means be located on the rear wheel side, that is, inside the V-belt means and also be of such a wet type as immersed in oil.

SUMMARY OF THE INVENTION

This invention has for its object to provide an apparatus in which the V-belt means and the wet type reduction gear means with the location as above are contained in a single common casing and the whole of the apparatus is small-sized, and it is characterized in that a case main body extending from one lateral side of an internal combustion engine to one lateral side of a rear wheel in rear of the engine and supporting pivotally an axle of the rear wheel is applied at its rearward portion with a transmission cover member which covers liquid-tightly a reduction gear means comprising the wheel axle, an input shaft and a gear train connecting therebetween, and is applied at its front portion with a V-belt cover member which covers a V-belt means comprising a pulley on the input shaft passing through the transmission cover member, a pulley on an output shaft of the engine and a V-belt connecting between the two pulleys.

DESCRIPTION OF THE DRAWINGS

The invention will now be described with reference to the accompanying drawings, in which.

DESCRIPTION OF THE PREFERRED EMBODIMENT

Figure 1:
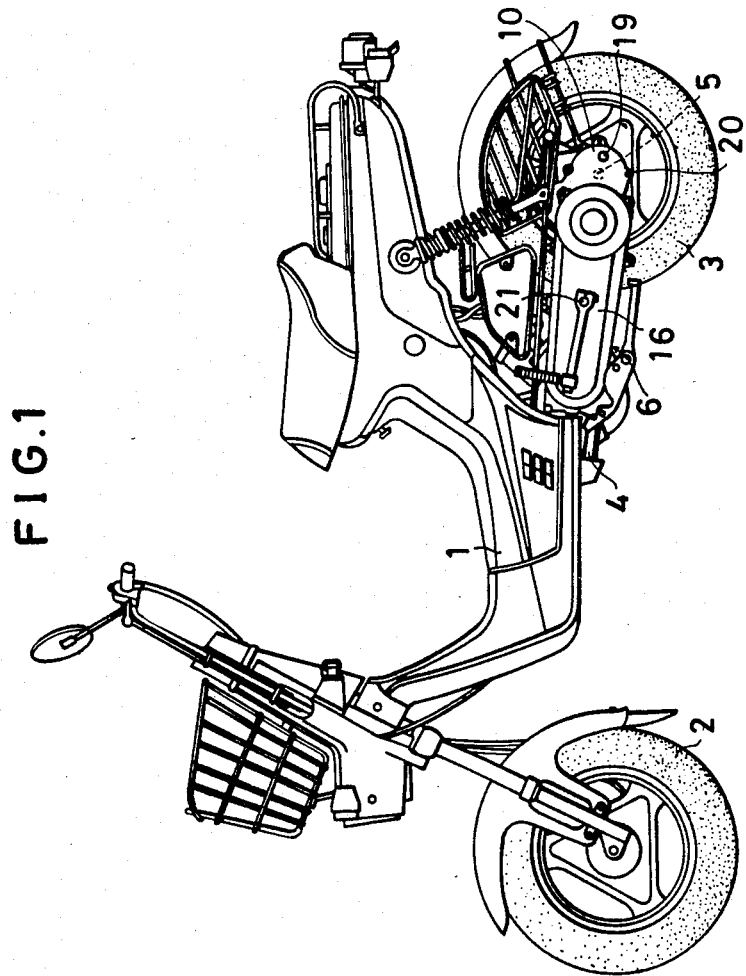
FIG. 1 is a side view of one example of this invention apparatus applied to a motorized two-wheeled vehicle.
Figure 2:
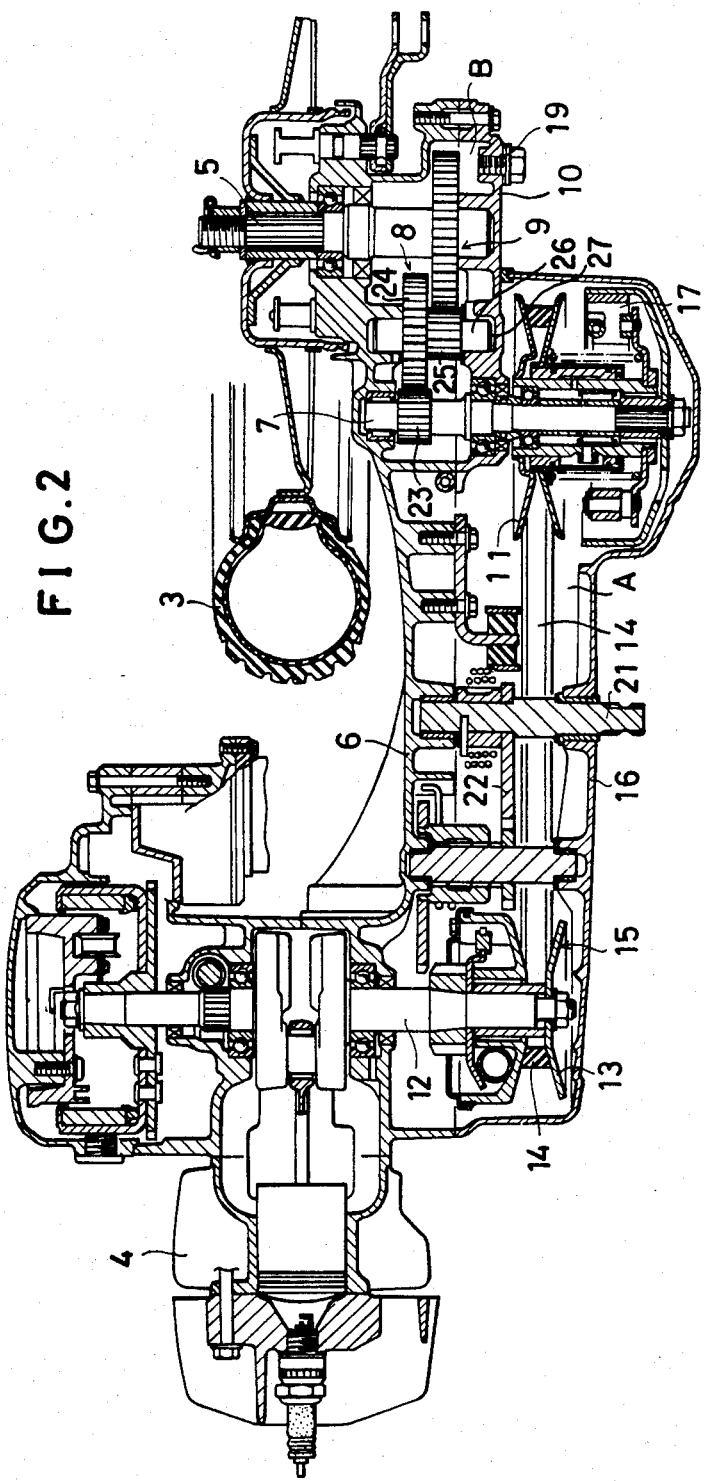
FIG. 2 is an enlarged sectional plan view of the same.
Figure 3:
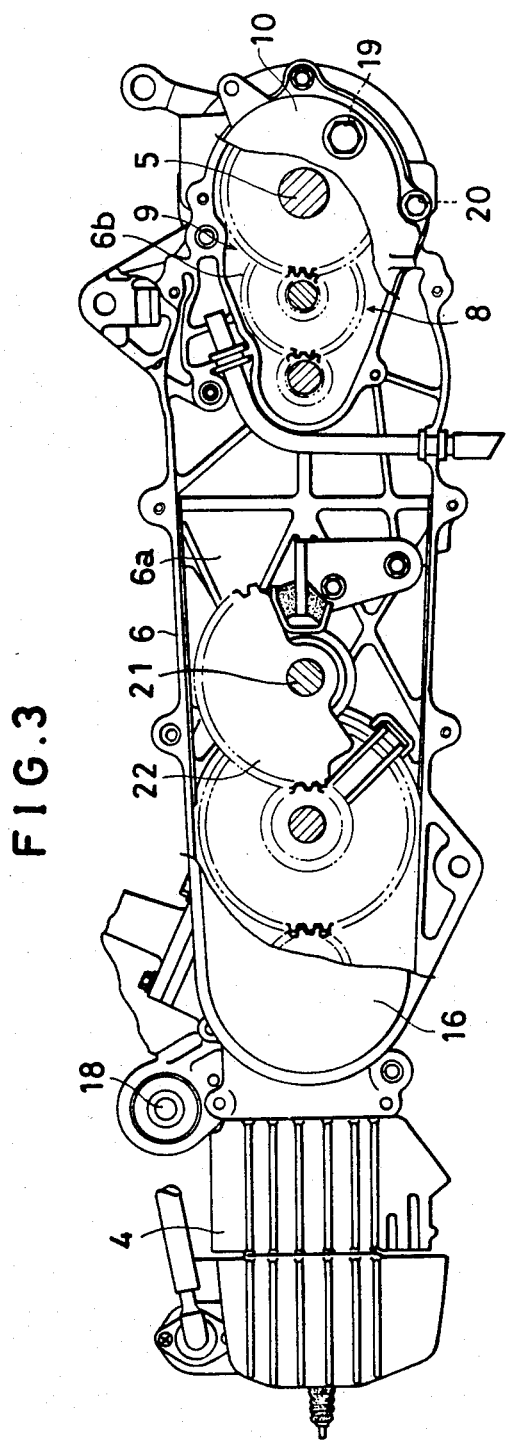
FIG. 3 is a side view, partly omitted, thereof.

One embodying example of this invention will be explained with reference to the accompanying drawings.

Referring to the drawings, numeral 1 denotes a vehicle body for a motorcycle or the like, numeral 2 denotes a front wheel thereof, numeral 3 denotes a rear wheel of the same, and numeral 4 denotes an internal combustion engine interposed between the two wheels, and there is provided a case main body 6 which extends from one lateral side of the engine 4 to one lateral side of the rear wheel 3 so as to form a rearwardly extending rigid frame and supports rotatably a wheel axle 5 of the rear wheel 3. The case main body 6 is partitioned at its interior into a front casing section 6a and a rear casing section 6b. The rear casing section 6b is applied with a transmission cover member 10 liquid-tightly so as to form a transmission chamber B, and the front casing section 6a is applied with a V-belt cover member 16 so as to form a V-belt chamber A.

The chamber B contains therein a reduction gear means 9 comprising the wheel axle 5, an input shaft 7 on the forward side of the wheel axle 5 and a gear train 8 interconnecting therebetween, and is charged with oil. The gear train 8 comprises a small diameter gear 23 mounted on input shaft 7. Gear 23 meshes with a first intermediate gear 24 which is coaxial with a smaller second intermediate gear 25, are mounted on an intermediate shaft 26. The gear 25 meshes with reduction gear 9 on the wheel shaft 5. The intermediate shaft 26 has one end positioned in a recess 27 in transmission cover member 10, the other end being positioned in a recess 28 in main body 6.

The chamber A contains therein a V-belt means 14 comprising a pulley 11 mounted on a protruded portion of the input shaft 7 passing through the cover member 10, a pulley 13 mounted on an output shaft 12 of the engine 4 located in front of the input shaft 7 and a V-belt 14 extending and connecting between the two pulleys 11, 13. Thus, the case main body 6 is formed together with the cover members 10, 16 into an integrally combined assembly which contains in its rear section the reduction gear means 9 of wet type and in its front section the V-belt means 15 of dry type, in such an arrangement that the former 9 is closed to the rear wheel 3 and the latter 15 is located outside the same. Numeral 17 denotes an automatic centrifugal clutch means provided on an outer end of the input shaft 7. The case main body 6 is formed to be integral, at its front end portion, with the side surface of the engine so as to constitute as a whole a power unit, and this unit is swingably attached to the car body 1 side through a pivot 18 provided at its front upper end portion.

The transmission cover member 10 has a portion extending rearwards beyond the rear end of the V-belt cover member 16, and is provided at that extended portion with an oil charging opening 19 and an oil discharging opening 20 for interchanging of interior lubrication oil with a new one, and thus the work of interchanging of the oils can be carried out without detaching the V-belt cover member 16. In respect of the V-belt 14, it can be interchanged simply by detaching the cover member 16 alone. The case main body 6 is so formed that its plane on which the cover member 10 is to be put and its plane on which the cover member 16 is to be put are in the same plane, so that the same can be worked, for instance, by a milling cutter and the workability thereof can be improved. The case main body 6 and the V-belt cover member 16 are formed into such a convenient combination one that the two are put one upon another directly without using an interposed packing or the like therebetween and are joined together by screws such as bolts or the like, and thereby the cover member 16 can serve as an reinforcing member so as to increase the rigidity of the case main body 6.

Numeral 21 denotes a kick shaft for starting the engine 4, and numeral 22 denotes a starter gear train extending therefrom.

MODE OF OPERATION

The operation of the apparatus will be explained as follows.

The output of the engine 4 is transmitted through the V-belt means 15 and the reduction gear means 9 to the rear wheel 3, so that the vehicle is driven to run. In this apparatus, the two means 15, 9 are contained in the single common covered case main body 6 in front and rear relationship, so that the whole thereof becomes comparatively small in size. Additionally, the reduction gear means 9 is applied with the transmission cover member 10 liquid-tightly and the lubrication oil is held therein and thus the same can be always secured in a good lubrication condition.

Thus, according to this invention, the case main body extending in the front and rear directions is applied with the cover members and contains therein the reduction gear means and the V-belt means in front and rear relationship, so that the whole of the casing apparatus can be obtained with a comparatively small-sized one, and the reduction gear means is applied on its outer surface with the cover member liquid-tightly, so that lubrication oil can be held therein and the reduction gear means can be always kept in a good lubricating condition.

What we claim is:

1. A power transmission casing apparatus in a motorized two-wheeled vehicle comprising:

a case main body extending from one lateral side of an internal combustion engine to one lateral side of a rear wheel positioned rearwardly of said engine, said case main body rotatably supporting a wheel axle of said rear wheel and partially housing in a rear portion a reduction gear means which comprises the wheel axle, an input shaft, and a gear train operatively interconnecting the input shaft to the wheel axle, said casing apparatus also housing V-belt means comprising a rear pulley on the input shaft, a forward pulley on an output shaft of the engine and a V-belt operatively connecting the pulleys, each of the pulleys having a circumferential periphery;

a transmission side wall member extending to enclose said reduction gear means, said input shaft extending through said transmission side wall member; and a V-belt cover sealingly engaging with the case main body and extending from beyond the forward-most portion of the periphery of the forward pulley to beyond the rear-most portion of the periphery of the rear pulley to enclose the V-belt means;

said gear train comprising a gear of a small diameter provided on said input shaft, a gear of a large diameter provided on said wheel axle, and two intermediate gears which are integral and coaxial one with another and are provided on an intermediate shaft;

said intermediate shaft being located at a position which faces a recess portion formed on the inner side surface of a flange of said rear pulley and a bearing portion of said intermediate shaft projecting towards said inner side surface.

2. A power transmission casing apparatus of claim 1 wherein said transmission side wall member is a cover member sealingly engaging with said case main body in a fluid tight manner, and an abutment surface between said cover member and said case main body and an abutment surface between said V-belt cover and said case main body are in alignment one with another so as to become on the same plane.

* * * * *